Dec. 8, 1931.　　　　E. F. GEIGER　　　　1,835,386
BATTERY CHARGING DEVICE
Filed April 9 1930
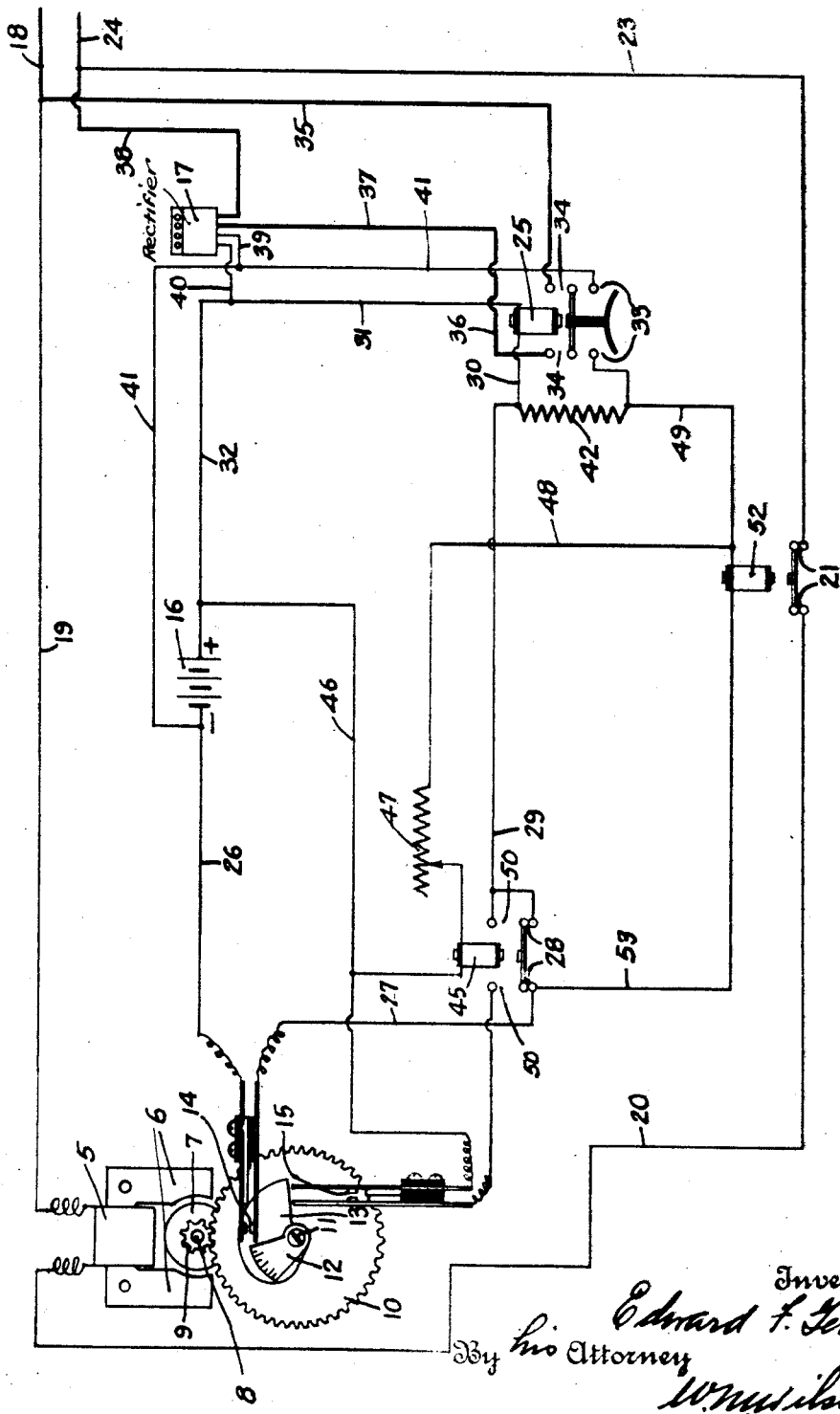
Inventor
Edward F. Geiger
By his Attorney Patented Dec. 8, 1931

1,835,386

UNITED STATES PATENT OFFICE

EDWARD F. GEIGER, OF BINGHAMTON, NEW YORK, ASSIGNOR TO INTERNATIONAL TIME RECORDING COMPANY OF NEW YORK, OF ENDICOTT, NEW YORK, A CORPORATION OF NEW YORK

BATTERY CHARGING DEVICE

Application filed April 9, 1930. Serial No. 442,964.

This invention relates to automatic charging devices for storage battery and more particularly to automatic charging devices which are operated cyclically from a motor or timing mechanism.

In batteries which normally dissipate current at a very low rate and only at intervals discharge at a comparatively high rate there has always existed a problem of charging automatically. The expedient of merely setting a charging rate to be applied at predetermined intervals has obviously been unsatisfactory due to the irregularity of discharge conditions. Should such a charge be set to take care of the normal requirement it would be entirely inadequate for the occasional requirements, and should it be set to take care of the larger loads it would result in detrimental overcharging under its normal conditions. The use of high and low voltage control relays for effecting the initiating of charging operations when the battery voltage has reached a minimum predetermined voltage, and to terminate charging operations when the battery has reached its maximum voltage, has not been satisfactory for batteries used in this class of service. Particularly is this true in the case of batteries used for emergency service such as "stand-by" batteries. Batteries used for this type of service stand for long periods with practically no discharge and become sluggish and deteriorate without occasional overcharges or freshening charges. As the voltage on an idle battery would not drop an appreciable amount, no low voltage relay would be able to detect the necessity for initiating a freshening charge. Furthermore, it is well known that a battery subject normally to a discharge of a constant rate loses in capacity gradually if the charge returned to the battery is just sufficient to compensate for the ampere hours dissipated. Such batteries occasionally require an overcharge to bring their capacity back to normal and restore them to a healthy condition. To give them an overcharge at each charging period when not required would also be deleterious to the battery.

To test a battery by means of its voltage on open circuit does not show the true condition of the battery. Particularly is this true of the acid lead plate type of storage battery in which the open circuit voltage remains fairly constant even though the battery be only partially charged. On the other hand, to test the battery voltage under load only gives a fair approximation under conditions where constant loads are pulled steadily from a battery. If a battery is subjected to loads of discharge of greater than its normal discharge capacity at periodic intervals of short duration, the sudden load will have an effect of pulling down the voltage of the battery at the time said load is imposed without the corresponding depletion in the battery capacity that such a drop in voltage would seem to indicate. The operation of a large clock system is a typical example of such a condition, in which a load of one seconds duration is imposed on the battery once each minute. Assume, for example, a system drawing three amperes operated by a storage battery of twelve ampere hours capacity having a normal discharge rate of 1.5 amperes. This is not an unusual condition in practice. The load imposed by the clock system being twice the normal discharge rate of the battery has a tendency to draw down the voltage each time it is imposed but the total amount of discharge for that short period has but little effect on the depletion of the capacity of said battery.

The use of a hydrometer for testing batteries is not satisfactory as the specific gravity of the electrolyte is dependent on more factors than its state of charge. As the water evaporates the specific gravity changes and if tested just after the addition of water, the results are misleading.

The condition of a partially discharged battery can readily be ascertained only after having been completely charged by taking into consideration the charging rate and the time required at that rate to bring the battery back to full charge.

Therefore, knowing the normal duty a storage battery of known capacity is subjected to and given a fixed rate of charge, a fixed period may be determined within which said battery should be brought back to its fully charged condition and in event that the battery failed to respond fully within said fixed period, it would indicate that an overcharging operation was necessary. In event the battery reaches its fully charged condition within said period the charging circuit is cut off and no further charge is supplied until the next period. Said charging periods may be periodic as well as predetermined.

To the best of the applicant's knowledge no device accomplishing this has ever been disclosed.

It is the purpose of this invention to provide a charging device which will periodically connect a battery with a charging circuit, timing the first interval of charging to determine whether or not the battery will be raised to a predetermined voltage within this first timed interval which is predetermined in accordance with the duty of the battery and the rate at which the battery is being charged. This first interval of charge is timed to bring the battery back to full charge under normal conditions, that is, if the battery has been subjected to only its normal cycle of duty between charging cycles and if the battery is in a normal healthy condition. If the battery reaches this predetermined voltage within this set time interval, devices operate to terminate the charge when said predetermined battery voltage is reached. If, however, upon the termination of this timed interval, the battery has not reached its predetermined charge, it is indicative that the battery has been subjected to a duty between cycles heavier than normal or that the condition of the battery through constant use has become sluggish or otherwise unhealthy so that in either case an overcharge is advised. This device therefore operates to stop the timing mechanism at this point but continuing the charging of the battery as long as necessary until the battery reaches its predetermined voltage at which time the timing device then resumes operation and a predetermined timed overcharge is put into the battery.

An object of this invention is to provide a charging system for a storage battery having a timing device for periodically initiating a charging operation and devices for determining if the battery reaches a predetermined voltage within a predetermined interval.

Another object of this invention is to provide a charging device for determining if the voltage of a battery being charged has reached a predetermined amount within a predetermined timed interval and for terminating the charging operation if said voltage is reached within said interval.

Still another object is to provide a charging device for determining if the voltage of a battery on charge has reached a predetermined amount within a predetermined timed interval and for continuing the charge beyond said timed interval if said voltage is not reached within the prescribed time.

A still further object is to provide a charging device for periodically initiating a charging operation of a battery and for initiating a timed interval of overcharging if the voltage of said battery does not reach a predetermined voltage within a predetermined interval timed from the initiation of the first charging operation.

A still further object of the invention is to provide a cyclically operated device for periodically initiating a charging operation of a battery for a predetermined duration and battery controlled devices for holding the charging operation in effect after the termination of the predetermined duration for an indefinite period until said battery becomes fully charged.

Various other objects and advantages of my invention will be obvious from the following particular description of one form of mechanism embodying the invention or from an inspection of the accompanying drawing; and the invention also constitutes certain new and novel features of construction and combination of parts hereinafter set forth and claimed.

The single figure of the accompanying drawing shows a diagrammatic wiring layout of the charging device.

A cyclically operated mechanism such as a clock mechanism driven in any approved manner or an electric motor is provided. In the preferred embodiment herein described, an electric motor has been diagrammatically indicated having a field coil 5 for magnetically saturating the magnet poles 6. Between said poles there is rotatably mounted an armature 7 fixed to a shaft 8 journalled in the framework of the motor. Fixed to said shaft is a pinion gear 9 which meshes with a larger gear 10 fixed to a shaft 11 which is journalled in the frame of the timing mechanism, not shown. Fixed to said shaft 11 are a plurality of adjustable cams 12 and 13 each coacting with contacts 14 and 15 respectively. In the present embodiment a battery 16 is to be charged from alternating current, which is the most universally used and which requires the use of some type of suitable rectifying means diagrammatically indicated at 17. The gear ratio between the armature and cams may be arranged to turn said cams for any desired cycle but for the following description let it be assumed that the shaft 11 and therefore the cams 12 and 13 make one revolution per hour. Let it further be assumed that the cam 12 is set to close the normally open contacts 14 at what we may term a zero position and open it at 3 minutes past the zero position. This setting will vary according to the normal duty of the battery. The zero position will be considered that position at which the contact 14 closes. The cam 13 will be then set to open the normally closed contacts 15 at the same time the contacts 14 open which as explained will be 3 minutes after the zero position, said contacts 15 will be further set to close at a position equivalent to 30 minutes of operation of the timing mechanism, excluding the time said mechanism may be stopped.

The timing mechanism is operated from the power supply as follows: from supply line 18, through line 19, motor field coil 5, line 20, normally closed contacts 21, line 23 to the other power supply line 24. With the cams 12 and 13 now timing the contact 14 closes when the zero position is reached. The closing of said contacts causes the relay magnet 25 to become energized as follows: from the negative terminal of battery 16 through line 26, contact 14, line 27, normally closed relay contacts 28, lines 29 and 30, relay magnet 25, lines 31 and 32, to the positive terminal of battery 16. With the relay magnet 25 energized its armature is attracted closing normally open contacts 33 and 34. This closes the primary side of the rectifying unit 17 as follows: from power supply line 18, through line 35, contacts 34, lines 36 and 37, primary side of rectifier 17, line 38, to other power supply line 24. The lines 39 and 40 from the secondary side of the rectifier 17 are permanently connected to the negative and positive terminals respectively of the battery 16 so that charging of said battery is now effected. The closing of contacts 33 causes a holding circuit to be established through the relay coil 25 as follows: from negative terminal of battery 16, through line 41, contacts 33, resistance 42, line 30, relay magnet 25, line 32 to the positive terminal of battery 16. Since the amount of current required to hold the relay armature against the pole face of the magnets is much less than that required to attract the armature from its deenergized position, the introduction of the resistance 42 will not cause the armature to drop should the initial pick-up circuit be opened. The value of the resistance 42 is selected with this in view as well as to balance other operations of the circuit. Said values will be set forth and described later.

In addition to the holding circuit just mentioned the closing of contact 33 connects the relay magnet 45 across the battery 16 through the following circuit: from the positive terminal of battery 16, through line 46, relay magnet 45, adjustable resistance 47, line 48, line 49, contacts 33, line 41, to the negative battery terminal. The purpose of the adjustable resistance 47 is to adjust the pick up voltage of the relay magnet 45 so that it will pick up its armature only when the battery voltage rises to a predetermined voltage, for example 2.15 volts per cell. The predetermined interval which is assumed to have been set for a 3 minute period for the purpose of illustration is actually set in accordance with the normal duty of the battery and the charging rate so that when the battery is subjected to only its normal discharge duty between charging cycles, it will receive a full freshening charge within the time set, and the charging operation will only exceed this time interval when the battery has been subjected to a load greater than normal or when the battery has become sluggish or sulphated because of lack of overcharging. When the charging operation exceeds this interval, it indicates the necessity of an overcharging operation which is accomplished in a manner to be described later.

When the battery reaches the predetermined voltage for which the relay magnet 45 is set, within the predetermined interval, said magnet will attract its armature causing normally closed contacts 28 to open and closing normally open contacts 50. The closing of contacts 50 establishes a shunt circuit across the relay magnet 25 thus deenergizing said magnet and allowing its armature to drop and open its associated contacts thereby terminating the charging operation. The shunt circuit around said relay magnet is as follows: from positive terminal of battery 16, line 46, closed contact 15, contacts 50 (now closed) line 29, resistance 42, contacts 33 (now closed) line 41 to negative battery terminal. The relay magnet 45 will remain energized until the end of the predetermined period when contact 14 will open. The continued energization of this magnet is maintained during this period by the current passing through the coil 52 in the following circuit: from negative side of battery 16, line 26, contact 14, lines 27 and 53, coil 52, line 48, resistance 47, coil 45, line 46 and back to the positive terminal of battery 16.

If the battery fails to reach the voltage at which the relay magnet 45 will pick up within the 3 minute predetermined interval, the charging operation will not have been terminated when the contact 14 opens at the expiration of this interval. The holding circuit previously explained will continue to hold contacts 33 and 34 closed and thus continue the charging operation. At the end of the 3 minute period contacts 14 will open and at the same time contact 15 will open. It will be observed that with contact 14 closed it forms a shunt circuit around the relay magnet 52 from the negative battery terminal to the relay contacts 28, thus insufficient current flows through this magnet to attract its armature. Now with contact 14 opened and contact 28 still closed, sufficient current will flow through relay magnet 52 to attract its armature causing contacts 21 to break and open the power circuit through the field coil 5 of the motor thus causing it to stop. The circuit through magnet 52 is now from the positive terminal of battery 16, through line 32, magnet coil 25, lines 30 and 29, contacts 28, line 53, magnet coil 52, line 49, contacts 33, line 41 to negative side of battery 16. Part of the current goes through resistance 42 which is in a parallel circuit with the magnet 52. The relative current values are explained later.

The battery continues to be charged until it reaches 2.15 volts per cell at which time the relay magnet 45 picks up its armature closing contacts 50 and opening contacts 28 thus opening the circuit through relay magnet 52 thereby closing contacts 21 which closes the power circuit through motor field coil 5 and resumes operation of the timing mechanism. Relay magnet 25 continues to hold its armature receiving current from the battery through the resistance 42, thus still keeping the battery on charge. This charging continues while contact 15 remains open until the timing mechanism has run the predetermined duration as adjusted by the cam 13 which we have assumed to be an equivalent of 30 minutes operating time. This permits a substantial overcharge to be effected.

At the end of this overcharge period contact 15 closes which establishes a shunt circuit around the relay magnet 25 as previously described, the contacts 50 being now closed. The relay magnet 25 being thus deenergized, due to said shunt circuit, causes relay contact 34 to open thus terminating the charging operation by opening the primary circuit of the rectifying unit; and also causes contacts 33 to open the circuit through relay magnet 45, causing relay contacts 50 to open and relay contacts 28 to close, the circuits now being left in the same condition as previous to the closing of contact 14 at the beginning of the charging operations.

In order to make the operations of the circuits clearer it is believed that an assumption of definite values as would be applied to a specific case would help. Let it be assumed therefore that an eight cell acid lead plate storage battery is to be used. The normal voltage of this battery is 2 volts per cell or 16 volts except at the end of an overcharging period at which time the voltage of the battery will rise to approximately 2.3 volts per cell or 18.4 volts. Relay magnet 25 will be wound to 100 ohms and will require a pick-up current of approximately .095 amperes whereas once the armature is picked up it will hold to the pole faces with a current of .01 amperes or slightly lower.

Relay magnet 45 is wound to 900 ohms and has an external resistance set for 100 ohms to make said relay magnet pick up its armature when the battery voltage is 17.2 as the amount of current required to this is $$.0172 \text{ amps} - \left(\frac{17.2}{900+100} = .0172\right).$$

Relay magnet 52 is wound to 100 ohms and requires .06 amperes to attract its armature. Resistance coil 42 is 900 ohms.

When contact 14 closes the battery voltage will probably be 2 volts per cell but if very badly discharged would possibly be as low as 1.8 volts per cell. In the latter case the voltage of the battery would cause a current of .154 amps to flow through the relay magnet coil 25 sufficient to pick up its armature.

When contact 14 opens the battery voltage will have normally been built up to 2 volts per cell which is not sufficient to energize coil 45. The relay magnet 25 receives current through resistance 42 and relay magnet 52 which are in a parallel circuit, the combined resistance of which is $$\frac{1}{\frac{1}{100}+\frac{1}{900}} = 90 \text{ ohms,}$$

the flow of current through magnet 25 will be $$\frac{16}{90+100} = .084 \text{ amps}$$

which is sufficient to hold the armature of the relay 25 and said current will be divided with one part through resistance 42 and nine parts through relay magnet 52 or .0756 amps will flow through relay magnet 52 which is sufficient to cause said magnet to attract its armature and open the motor circuit.

Should the battery be in such bad shape that the battery voltage is still only 1.8 volts per cell at the time contact 14 opens the current through magnet 25 will be $$\frac{14.4}{90+100} = .0757 \text{ amperes}$$

which is still sufficient to hold the armature of relay 25, and the current through the relay magnet 52 will be .068 amperes which is sufficient to operate this relay to open the motor circuit.

When battery voltage reaches 2.15 volts per cell or 17.2 volts for the battery, relay magnet 45 will attract its armature breaking contacts 28 and thereby opening the circuit through relay magnet 52. Relay magnet 25 will continue to hold up through resistance 42 as $$\frac{17.2}{900+100} = .0172 \text{ amperes}$$

will flow through said magnet as contacts 15 are open.

Should contacts 14 and 15 happen to be both closed through an error in timing the contacts and relay magnet 45 attracting its armature and relay magnet 25 deenergized there will be a flow of current through relay magnet 52 from the negative battery terminal through relay magnet 45, resistance 47 and resistance 42. The combined resistance of these is $$\frac{1}{\frac{1}{1000}+\frac{1}{900}} \text{ or } 474 \text{ ohms.}$$

Current through relay magnet 52 under such conditions therefore would be $$\frac{17.2}{474+100}=.029 \text{ amperes}$$

which is not sufficient to cause said relay magnet to pick up its armature.

It is therefore impossible for such a condition to stop the motor and leave the charging device inoperative.

The adjustment of the charging apparatus for a practical application might be as follows: Assume a battery is being used for operating an electric clock and program system and said system drew 4 ampere minutes each hour and the battery was to be periodically charged each hour. The cam 12 would be adjusted in accordance with the allowable charging rate of the battery and rectifier to return about 5 ampere minutes to the battery each hour, thus returning slightly in excess of that withdrawn. After this discharge and charge cycle had been continued for some time the battery would gradually lose its capacity until the 5 ampere minutes returned to the battery would not be sufficient to bring the battery back to its normal voltage. This being the case indicates that an overcharge is necessary and is so detected by the failure of the relay 45 to pick up within the allotted time. The battery therefore continues charging until its voltage rises to the fully charged value and then an additional overcharge of predetermined duration is added. This duration may be 30 minutes or more or less depending on the battery capacity and rate of charge.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. In combination, a storage battery, a charging circuit therefor, means for periodically charging said battery, said means comprising means for determining if said battery requires an overcharge.

2. In combination, a storage battery, a charging circuit therefor, means for periodically charging said battery, said means comprising means for determining if said battery requires an overcharge, and means for effecting an overcharge of predetermined duration.

3. In combination, a storage battery, a charging circuit therefor, means for periodically initiating a test charge, means limiting the duration of said test charge and means for effecting a predetermined overcharge at the termination of said test charge.

4. In combination, a storage battery, a charging circuit therefor, means adapted to periodically initiate a charging operation of said battery, means to adjust the duration of said charging operation to compensate for the normal discharge of said battery and means for effecting an overcharge of predetermined duration if compensation is not completed during said first named charging duration.

5. In combination, a storage battery, a charging circuit therefor, means for periodically effecting a charging operation to compensate for the normal discharge of said battery, means for sensing if compensation has been effected within a predetermined interval and means controlled by the sensing means for effecting an overcharging operation if compensation has not been effected within said interval.

6. In combination, a storage battery, a charging circuit therefor, means for periodically initiating a charging operation to bring said battery to a predetermined voltage, means for predetermining the duration of said charging operation, and means for effecting an overcharge of said battery if said predetermined voltage is not reached within the predetermined duration.

7. In combination, a storage battery, a charging circuit therefor, means for periodically initiating a charging operation to bring said battery to a predetermined voltage within a predetermined timed duration, and means for effecting an overcharge if said voltage is not reached within said timed duration.

8. In combination, a storage battery, a charging circuit therefor, means for effecting a charging operation to bring said battery to a predetermined voltage within a predetermined timed duration, and means for effecting an overcharge of a predetermined amount if said battery voltage is not reached within said timed duration.

9. In combination, a storage battery, a charging circuit therefor, means for initiating a charging operation of said battery, means for sensing if said battery is fully charged within a predetermined timed interval and means for effecting an overcharging operation if said battery does not become fully charged within said timed interval.

10. In combination, a storage battery, a charging circuit therefor, means for periodically initiating a charging operation of said battery, means for sensing if said battery is fully charged within a predetermined time from the initiating of said charging operation, and means controlled by the sensing means for terminating said charging operation before said predetermined time has elapsed if said battery becomes fully charged.

11. In combination, a storage battery, a charging circuit therefor, cyclically operated means for periodically initiating a charging operation of said battery and for controlling a timed interval of said charging operation, battery controlled means for sensing when said battery has reached a predetermined voltage, and means controlled by said battery controlled means for terminating said charging operation if said predetermined battery voltage has been reached during said timed intervals.

12. In combination, a storage battery, a charging circuit therefor, normally operated means for periodically initiating a charging operation of said battery and for controlling a timed interval of said charging operation, means for sensing when said battery has reached a predetermined voltage, means for stopping the operation of said normally operated means if said predetermined voltage has not been reached during said timed interval and resuming the operation of said normally operated means when said predetermined voltage has been reached.

13. Means for charging a storage battery, comprising a charging circuit, a normally operated mechanism for periodically connecting said charging circuit to the battery for a predetermined interval, means for sensing the condition of said battery and adapted to disconnect the circuit from the battery during said interval, means for halting the operation of said normally operated mechanism when the sensing means has not operated during said interval, means for resuming operation of the normally operated mechanism and means thereafter operated by said normally operated mechanism for disconnecting the charging circuit from the storage battery.

14. In combination, a storage battery, a charging circuit therefor, means for periodically connecting said battery to said charging circuit for a predetermined charging interval and means controlled by the battery for disconnecting said battery from said charging circuit before said predetermined charging interval is completed.

15. In combination, a storage battery, a charging circuit therefor, means for periodically connecting said battery to said charging circuit for a predetermined charging interval, means controlled by the battery for preventing the termination of said charging operation at the end of the predetermined interval.

16. In combination, a storage battery, a charging circuit therefor, means for connecting said battery to said circuit for a predetermined charging interval and means controlled by the battery for extending said charging interval an indefinite amount.

17. In combination, a storage battery, a charging circuit therefor, a normally operating mechanism for periodically effecting a charging operation of said battery, means controlled by said normally operated mechanism for timing an interval of said charging operation, additional means controlled by said operating mechanism for timing a second interval of said charging operation; and battery controlled means for transferring the control of said charging operation from the first named means to the second named means.

18. In combination, a storage battery, a power supply for charging said battery, a charging circuit for connecting said battery with said power supply, means normally operated by said power supply for periodically connecting said charging circuit to said battery for a predetermined charging interval, battery controlled sensing means for disconnecting said charging circuit from the battery if the battery reaches a predetermined voltage during said predetermined charging interval, means controlled by said battery controlled means for halting the operation of said power supply operated means if said predetermined battery voltage is not reached during said predetermined charging interval, means controlled by said battery controlled sensing means for resuming operation of said power supply operated means when the battery reaches said predetermined voltage and means controlled by the power supply operated means for thereafter effecting an overcharge of a predetermined duration.

19. In combination, a storage battery, a charging circuit therefor, means for timing two charging operations, means for sensing the voltage of the battery during one timed charging operation, said means rendering the second timed charging operation effective if the battery fails to reach a predetermined voltage during the first timed charging operation.

20. In combination, a storage battery, a charging circuit therefor, means for effecting a predetermined timed charging operation of sufficient duration to effect a normal replacement charge of the battery to bring said battery to a predetermined voltage and means for effecting a predetermined timed overcharging operation if the predetermined battery voltage is not reached during the first timed operation.

In testimony whereof I hereto affix my signature.

EDWARD F. GEIGER.